No. 610,052. Patented Aug. 30, 1898.
M. W. HIBBARD.
DEVICE FOR ACTUATING FLUID PRESSURE BRAKES.
(Application filed Mar. 18, 1898.)
(No Model.) 3 Sheets—Sheet 1.
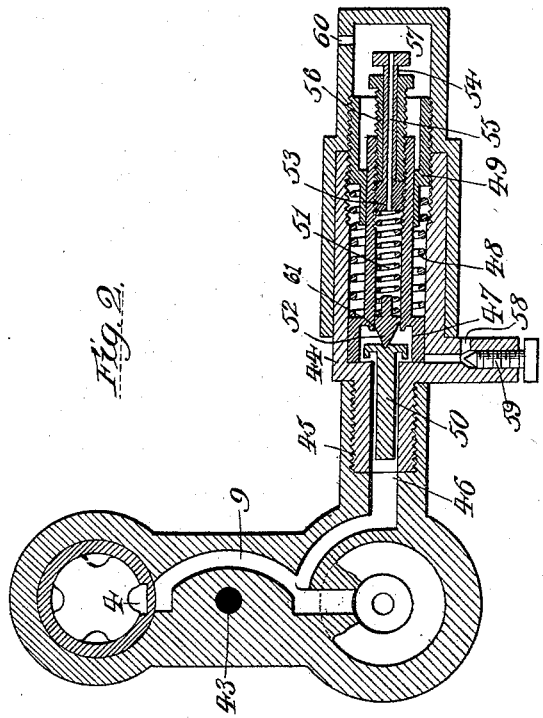
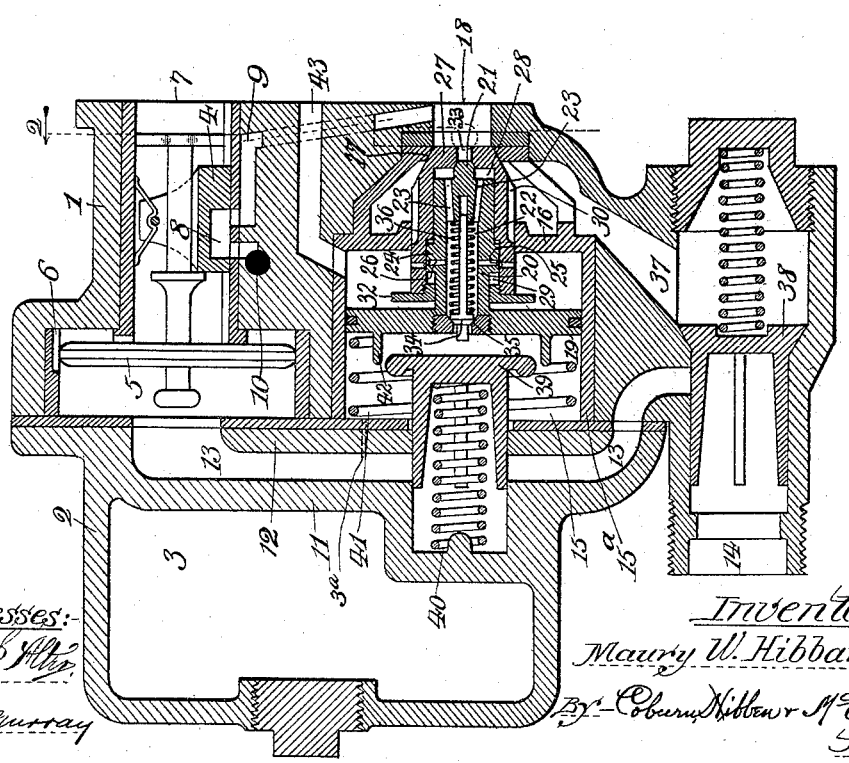
Witnesses:
Inventor:—
Maury W. Hibbard.

No. 610,052. Patented Aug. 30, 1898.
M. W. HIBBARD.
DEVICE FOR ACTUATING FLUID PRESSURE BRAKES.
(Application filed Mar. 18, 1898.)
(No Model.) 3 Sheets—Sheet 2.
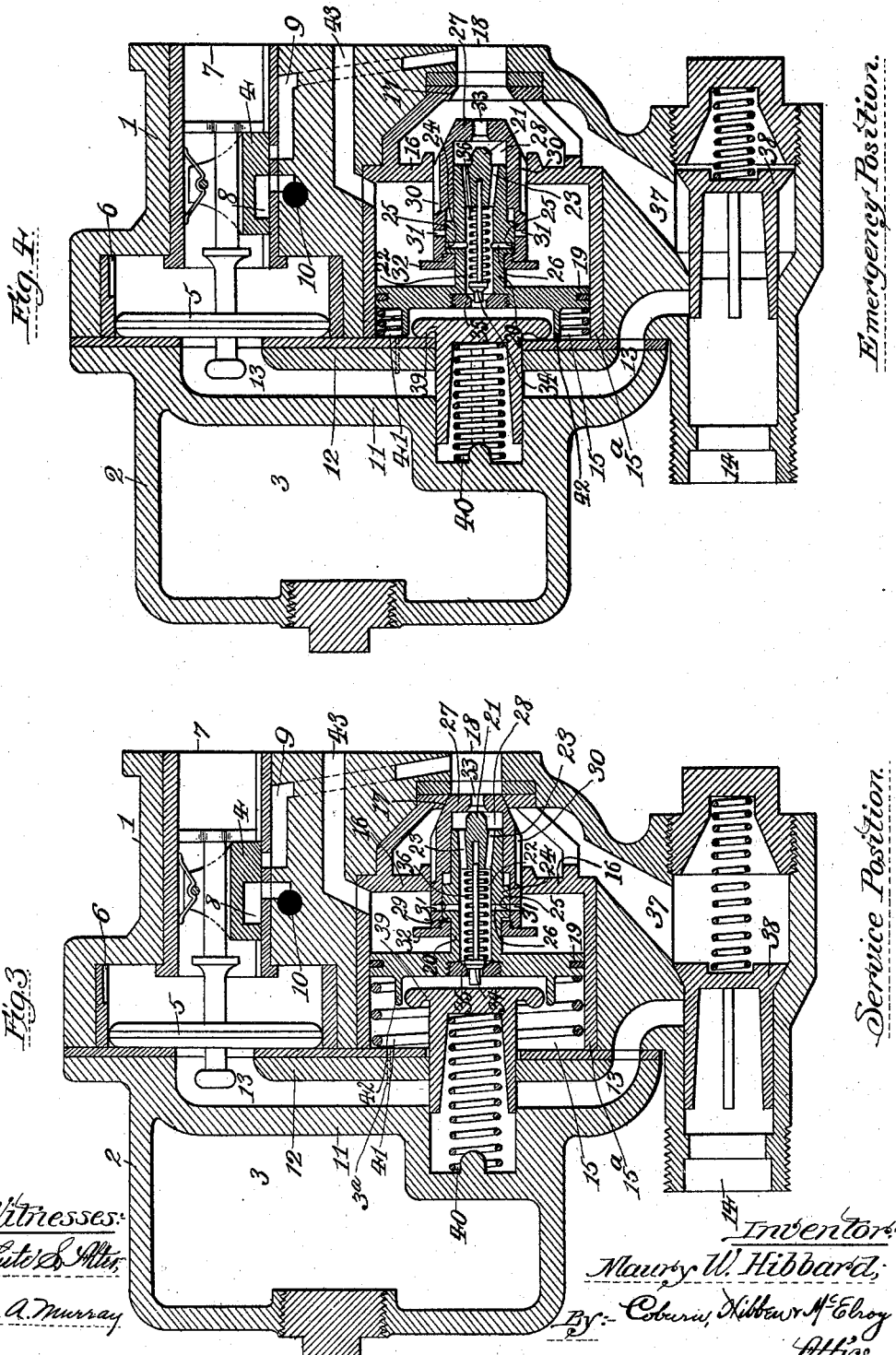
Witnesses:
Inventor:
Maury W. Hibbard,
By Coburn, Hibben & McElroy
Att'ys No. 610,052. Patented Aug. 30, 1898.
M. W. HIBBARD.
DEVICE FOR ACTUATING FLUID PRESSURE BRAKES.
(Application filed Mar. 18, 1898.)
(No Model.) 3 Sheets—Sheet 3.
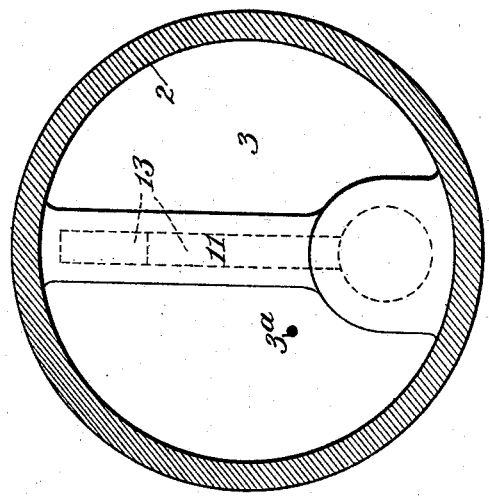
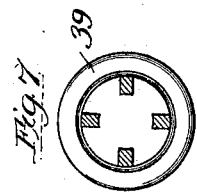
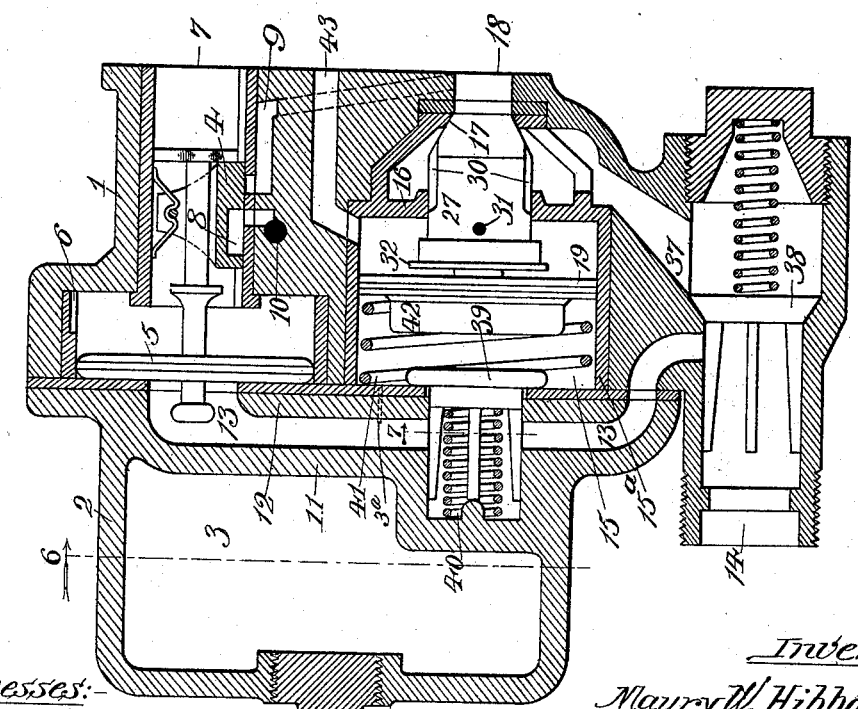
Witnesses:
Inventor:
Maury W. Hibbard,
By Coburn, Hibben & McElroy
Attys.

UNITED STATES PATENT OFFICE.

MAURY W. HIBBARD, OF CHICAGO, ILLINOIS, ASSIGNOR TO RICHARD FITZGERALD, OF SAME PLACE.

DEVICE FOR ACTUATING FLUID-PRESSURE BRAKES.

SPECIFICATION forming part of Letters Patent No. 610,052, dated August 30, 1898.

Application filed March 18, 1898. Serial No. 674,304. (No model.)

*To all whom it may concern:*

Be it known that I, MAURY W. HIBBARD, a citizen of the United States, residing at Chicago, in the county of Cook and State of Illinois, have invented a certain new and useful Device for Actuating Fluid-Pressure Brakes, of which the following is a specification.

The general object of my invention is to produce an efficient and reliable device for actuating railway-brakes; and one of its principal objects is to provide such a device which shall be capable of actuating the brakes of trains running at a high speed, enabling the stoppage of the train in the shortest time and without sliding of the wheels. It is known that a heavy tension of the brake-shoe on the wheel at a high speed will not slide the wheel, but the same tension will cause the wheel to slide as the speed slackens. The production of a device that will set the brakes with a heavy tension when the train is at high speed and will relieve that tension proportionately as the speed decreases and retain the high pressure in the reservoir is one of the objects of this invention.

In the drawings, Figure 1 is a sectional elevation of my device; Fig. 2, a section on line 2 of Fig. 1; Figs. 3, 4, and 5, sectional elevations showing the parts in service position, emergency position, and post-emergency position, respectively; Fig. 6, a sectional elevation of the expansion or high-speed chamber, and Fig. 7 a detail view of the valve or tailpiece behind the piston in the emergency-chamber.

The casing 1 contains the operative parts of the device and has a cap 2, which forms what I will term an "expansion" or "high-speed" chamber 3. The casing is provided with two principal chambers, the upper one containing the brake-release mechanism and designated the "release-chamber," and the lower one containing the service and emergency mechanism and designated the "emergency-chamber." In this upper chamber is a slide-valve 4, actuated by a piston 5, provided with the usual by-port 6 for feeding up the auxiliary reservoir, connection with which is represented at 7. The slide-valve has a recess 8, adapted to normally connect the port 9 from the brake-cylinder with the release-port 10.

The cap 2 has a rib 11, which, together with the bushing 12, forms a passage 13, leading from the train-pipe connection 14. This passage leads into the brake-release chamber and also into the emergency-chamber through a side opening in the bushing.

In the emergency-chamber 15 is arranged a bushing $15^a$, having a partition portion 16 and forming a valve-seat 17 in the passage or connection 18 with the brake-cylinder. A piston 19 travels in this chamber and is provided with a stem 20, having a valve 21 upon its end, forming the service-valve of the device. This stem has a large longitudinal bore 22, terminating in several small openings or passages 23. This stem is also provided with an annular ring or flange 24, preferably formed as part thereof, which flange has a circular groove 25 communicating with the interior of the stem through the transverse passages 26.

The emergency-valve 27 is adapted to seat on the valve-seat 17 and is provided with a smaller bore 28, receiving the free end of the service-valve stem, and with a larger bore 29, receiving the annular ring 24. The emergency-valve fits the opening in the partition and has one or more grooves 30 and holes 31 for the passage of fluid under pressure, as hereinafter set forth. The open end of the emergency-valve is closed by a split nut 32, which also retains the emergency-valve upon the stem of the service-valve, but permits of the independent movement of these two valves. The other end has a port 33 leading to the brake-cylinder and controlled by the service-valve.

An emergency release-valve 34 is arranged in the hollow stem of the service-valve and seats upon the seat 35, which is preferably screwed into the piston and to which it is normally held by the tension of a suitable spring 36.

The emergency-passage 37 leads from the nozzle or train-pipe connection 14 and enters the emergency-chamber to the right of the partition, Fig. 1. This passage is properly controlled by the check-valve 38 to prevent the return of air into the train-pipe.

A valve or tailpiece 39 of the wing type is normally held projected through the side opening in the bushing 12 into the chamber 15 by means of a spring 40 and is adapted to control the communication between the train-pipe and the chamber 15.

The piston 19 may work against the tension of any suitable spring 41; but this spring is not, however, essential and may be entirely omitted. The piston is provided upon its outer face with an annular flange 42, which seats against the outer wall of the chamber in emergency action, which chamber communicates with the expansion-chamber by a small port 3ª, Fig. 6, located outside of the seat of the flange 42. The chamber in front of the piston connects with the auxiliary reservoir through any suitable passage, such as passage 43.

The device as thus far described is capable of operating to produce ordinary service and emergency applications of the brakes at the usual pressure, but with a liability of sliding the wheels in emergency application. The device may be made capable of working at the usual or at a higher pressure without danger of sliding the wheels, and thus operate as a high-speed brake-actuating mechanism. To this end I use a suitable pressure-reducing valve in connection with the brake-cylinder or its connections and also employ means whereby the communication between the auxiliary reservoir may be cut off from the brake-cylinder for emergency action.

In Fig. 2 is illustrated a form of pressure-reducing valve or "blow-down" which may be employed. As shown, it consists of a hollow casing 44, having a preferably screw-threaded stem 45, by which it may be screwed into any selected part of the brake system to accomplish the desired purpose. As shown, it is screwed into the valve-casing 1 to communicate with a branch passage 46, which in turn communicates with the passage 9, extending from the face of the brake-release valve to the brake-cylinder. A hollow piston 47 travels in the casing 44 and is normally held upon a seat at the inner end thereof by a suitable spring 48 abutting at its outer end against an adjusting-nut and guide 49.

A valve 50 has its stem guided in the hollow stem of the casing and its head adapted to travel in the hollow end of the valve 47, but it is not fitted tightly therein. This valve is normally held to its seat by a suitable spring 51, abutting at one end against a stem or follower 52 in contact with the valve 50 and at its other end against a screw-threaded adjusting-nut 53, having a stem 54 with a passage 55 therethrough. The nut is held in adjusted position by a lock-nut 56. This stem or follower 52 is preferably a solid conical piece which is adapted to travel in the narrower portion of the hollow piston 47, but is not fitted tightly therein, whereby the fluid-pressure is permitted to leak past it.

A hollow cap 57 fits over the end of the casing to close the same. The casing is provided with a discharge-passage 58, leading to the atmosphere from the inner end of the casing, which passage is regulated in size by an adjusting-screw 59. A second outlet 60 leads through the cap 57.

Although I have shown and described my blow-down device as attached to the casing 1, it will be understood that it may be attached elsewhere and accomplish the same results. For instance, it may be secured in the ordinary oil-opening of the brake-cylinder or other opening therein, or it may be attached to the pipe leading to the brake-cylinder.

The operation of the device for actuating the brakes will first be described without the blow-down or high-speed feature and then with it in operation. Train-pipe pressure feeds through the passage 13 into the auxiliary reservoir after passing the by-port 6, and also enters chamber 15, from which it feeds into the expansion or high-speed chamber 3 through the small port 3ª. The air will also pass from the auxiliary reservoir through passage 43 to the inner side of the emergency-valve chamber. The parts will now be in normal or running position, as shown in Fig. 1.

Upon a reduction of train-pipe pressure for service application of the brakes the piston 5 will actuate the slide-valve 4 to close the brake-release. The piston 15 will move outwardly and lift the service-valve from its seat to admit auxiliary-reservoir pressure through the ports and passages 31, 26, 23, and 33 to the brake-cylinder. The parts now occupy the position shown in Fig. 3 of the drawings. When the air in the reservoir has been reduced slightly below train-pipe pressure, such latter pressure will move the piston 19 inward and seat the service-valve, so that the brakes will remain set. If it is desired to apply the brakes with a greater tension, a further reduction of train-pipe pressure will admit more reservoir-pressure to the brake-cylinder, which operation may be continued until an equalization occurs between the auxiliary reservoir and the brake-cylinder.

In emergency action the parts assume the position shown in Fig. 4, in which operation the emergency-valve is lifted and the train-pipe pressure vented to the brake-cylinder, while the auxiliary-reservoir pressure passes through the grooves or cut-away portions 30 of the emergency-valve. When the valve 34 contacts the tailpiece 39 or the air-pressure overcomes the tension thereon, it will be opened to vent the air to the left of the piston until the annular flange 42 seats at the end of the chamber, at which time the tailpiece is also seated, owing to the reduction of train-pipe pressure, to close communication with the emergency-chamber.

In Fig. 4 I have shown the valve 34 in its open position immediately preceding its seating, although it will be understood that its closing is almost simultaneous with the seating of the piston and tailpiece. After emergency action the air will enter the emergency-chamber in the annular space outside of the flange 42 and will move the parts to the position shown in Fig. 5, whereupon the communication of the auxiliary reservoir and train-pipe with the brake-cylinder is cut off and the brakes will remain set.

When the high-speed feature is used in connection with my device, the operations above described are the same; but the blow-down device will operate to relieve the brake-cylinder of pressure above a certain predetermined amount and to decrease that pressure proportionately to the decrease in the speed of the car. The tension of the spring 51, which may be adjusted as desired, is such that it will not permit the valve 50 to lift unless a greater pressure in the brake-cylinder is produced than the equalization between the reservoir and brake-cylinder will give. Such greater pressure is produced in emergency action by the accumulated pressure of the auxiliary and train-pipe air, and this pressure will lift the valve 50, and, forcing it outward, will cause it to seat upon the seat 61, and thereby close the passage through the piston or valve 47. The pressure will also force this piston outward against the tension of its spring, whereupon the air can escape through the outlet 58 as rapidly as permitted by the adjustable screw 59, and the brake-cylinder pressure will be slowly relieved. Conditions require slow initial reduction and a rapid subsequent reduction of brake-cylinder pressure. This increasing reduction takes place when the brake-cylinder pressure has been sufficiently relieved to permit the spring 51 to raise its valve from its outer seat 61, whereupon pressure will find another outlet around this valve and through the bore of the piston 47 and passage 55 and through the outlet 60.

When the pressure has been reduced to that tension in the brake-cylinder as will not quite slide the wheels, the spring 48 forces the piston 47 home to its seat, and the valve 50 is likewise seated, so that the brake-cylinder pressure is retained at such tension. During this action, the auxiliary reservoir being cut off from communication with the brake-cylinder while the slide-valve holds the brake-cylinder port closed, the high pressure of the initial action is maintained in the auxiliary reservoir for another immediate emergency action, if needed. This closing of communication between the auxiliary reservoir and brake-cylinder in emergency action and the consequent results are accomplished without restoration of train-pipe pressure.

I claim—

1. In a brake mechanism, the combination, with the train-pipe, brake-cylinder and auxiliary reservoir, of valve mechanism for admitting fluid under pressure to the brake-cylinder and means independent of the brake-cylinder pressure and also independent of the difference between the train-pipe pressure and the auxiliary-reservoir pressure for closing such valve mechanism.

2. In a brake mechanism, the combination with the train-pipe, brake-cylinder and auxiliary reservoir, of valve mechanism for admitting fluid-pressure from the train-pipe to the brake-cylinder in emergency action and means for closing such valve mechanism independently of train-pipe pressure in such action.

3. In a brake mechanism, the combination with the train-pipe, brake-cylinder and auxiliary reservoir, of valve mechanism for admitting fluid-pressure to the brake-cylinder from the auxiliary reservoir and the train-pipe and means for closing such valve mechanism independently of train-pipe pressure in such action.

4. In a brake mechanism, the combination, with the train-pipe, brake-cylinder and auxiliary reservoir, of valve mechanism for admitting fluid under pressure to the brake-cylinder, a movable abutment to actuate such mechanism, and an expansion-chamber normally in communication with the train-pipe and whose pressure, after emergency operation, is adapted to operate the abutment to close the port to the brake-cylinder and close communication between the brake-cylinder and auxiliary reservoir.

5. In a brake mechanism, the combination with the train-pipe, brake-cylinder and auxiliary reservoir, of valve mechanism for admitting fluid under pressure to the brake-cylinder, and an air-chamber independent of the train-pipe and auxiliary reservoir and whose pressure closes such valve mechanism and cuts off communication between the auxiliary reservoir and brake-cylinder after an emergency action and before restoration of train-pipe pressure.

6. In a brake mechanism, an emergency-valve mechanism for operating the brakes in emergency action and closing the communication between the auxiliary reservoir and brake-cylinder after an emergency action and before restoration of train-pipe pressure whereby the pressure as equalized in emergency action is retained in the auxiliary reservoir.

7. In a brake mechanism, a pressure-reducing valve for reducing the pressure in the brake-cylinder, in combination with means adapted to admit fluid-pressure into the brake-cylinder and to retain the emergency pressure in the auxiliary reservoir during the emergency application of the brakes.

8. In a brake mechanism, the combination, with a train-pipe, a brake-cylinder and an auxiliary reservoir, of valve mechanism for admitting fluid under pressure to the brake-cylinder, means for closing such mechanism to cut off communication between the brake-cylinder and auxiliary reservoir after an emergency operation of the parts and during the emergency application of the brakes and means for reducing the brake-cylinder pressure above a predetermined amount.

9. In a brake mechanism, the combination with a train-pipe, a brake-cylinder and an auxiliary reservoir, of a casing having valve mechanism for admitting fluid-pressure to the brake-cylinder from both the train-pipe and auxiliary reservoir in emergency action, means for closing such mechanism to cut off communication between the brake-cylinder and auxiliary reservoir after an emergency operation of the parts, and means for relieving the brake-cylinder of pressure proportionate to the decrease of speed of the car.

10. In a brake mechanism, the combination, with the train-pipe, brake-cylinder and auxiliary reservoir, of valve mechanism for admitting fluid under pressure to the brake-cylinder from the train-pipe and auxiliary reservoir, means for causing such mechanism to close, after an emergency movement thereof, to cut off communication between the auxiliary reservoir and brake-cylinder, and a blow-down device for relieving excess pressure in the brake-cylinder by a slow initial reduction and an increased subsequent reduction proportionate to the decrease in speed of the car.

11. In a brake mechanism, the combination of an emergency-valve traveling in a chamber and adapted to vent train-pipe pressure into the brake-cylinder, a movable abutment for actuating said valve, means for releasing pressure from behind the abutment at emergency action and means for restoring pressure behind the abutment and moving the same to close communication between the brake-cylinder and the auxiliary reservoir after emergency pressure has obtained in the brake-cylinder and before restoration of train-pipe pressure.

12. In a brake mechanism, the combination of a train-pipe, a brake-cylinder, an auxiliary reservoir, a casing having a chamber, with connections respectively with the train-pipe, brake-cylinder and auxiliary reservoir, a partition therein, valve mechanism working therethrough to admit auxiliary-reservoir and train-pipe pressure into the brake-cylinder, a movable abutment traveling in said chamber to actuate said mechanism and having train-pipe pressure on one face and auxiliary pressure on the other face and means for releasing the brake-cylinder.

13. In a brake mechanism, the combination of valve mechanism for admitting fluid-pressure to a brake-cylinder, a movable abutment traveling in a chamber for actuating such valve mechanism and normally having train-pipe pressure on one face and auxiliary-reservoir pressure on the other face, means for venting in emergency action the pressure from behind the movable abutment and into the brake-cylinder, an expansion-chamber communicating with the abutment-chamber and an annular flange on the abutment adapted to close communication between the expansion-chamber and train-pipe and permit the pressure of such expansion-chamber to restore the valve mechanism and close communication into the brake-cylinder.

14. In a brake mechanism, the combination of a casing having two chambers, a service and an emergency valve working together in one of such chambers and adapted to control admission of pressure into the brake-cylinder, means for actuating the valves to close communication into the brake-cylinder after emergency action independent of restoration of train-pipe pressure and brake-release mechanism operating in the other of the two chambers.

15. A pressure-releasing device for the brake-cylinder pressure in a brake mechanism comprising a hollow casing communicating with the pressure of the brake-cylinder, a valve in the casing normally closing a port to the atmosphere but adapted to open such port when the brake-cylinder pressure rises to a predetermined point, and a second valve in the casing for causing an increased reduction after the initial reduction.

16. A pressure-releasing device for the brake-cylinder pressure in a brake mechanism comprising a hollow casing communicating with the pressure of the brake-cylinder, a valve in the casing for controlling an exhaust-port to the atmosphere and opening the same when the brake-cylinder pressure rises to a predetermined point, and a second valve controlling a second exhaust-port and adapted to open the same after the first reduction whereby an increased subsequent reduction is obtained.

17. A pressure-releasing device for brake-cylinder pressure in a brake mechanism comprising a casing communicating with the pressure of the brake-cylinder, a hollow valve therein having a passage therethrough, and governing an exhaust-port, a second valve traveling within the first valve and governing the passage through such first valve to a second exhaust-port and a spring adapted to raise the second valve to permit pressure to blow therearound and escape through the second exhaust-port.

MAURY W. HIBBARD.

Witnesses:
SAMUEL E. HIBBEN,
LOUISE E. SERAGE.